United States Patent [19]
Civanlar et al.

[11] Patent Number: 5,187,660
[45] Date of Patent: Feb. 16, 1993

[54] ARRANGEMENT FOR DISPLAYING ON A DISPLAY VOLUMETRIC DATA

[75] Inventors: M. Reha Civanlar, Red Bank; Steven C. Dzik, Somerset; Yuh-Tay Liow, Edison, all of N.J.

[73] Assignee: AT&T Bell Laboratories, Murray Hill, N.J.

[21] Appl. No.: 444,227

[22] Filed: Dec. 1, 1989

[51] Int. Cl.⁵ .............................................. G06F 15/00
[52] U.S. Cl. ................... 364/413.19; 395/119; 395/124
[58] Field of Search .................. 364/413.19; 395/124, 395/120, 119; 340/729

[56] References Cited

U.S. PATENT DOCUMENTS

| | | | |
|---|---|---|---|
| 4,539,639 | 9/1985 | LeCog et al. | 364/414 |
| 4,719,585 | 1/1988 | Cline et al. | 395/124 |
| 4,827,413 | 5/1989 | Baldwin et al. | 364/413.19 |
| 5,068,808 | 11/1991 | Wake | 395/119 |

OTHER PUBLICATIONS

Patent application, "High Resolution Graphics Machine Architecture", Howard-McMillan-Potmesil 1-1-1.
"The Pixel Machine System Architecture", AT&T-Pixel Machines, Crawfords Corner Rd., Holmdel, N.J. 07733.
IEEE Computer Graphics and Applications, Jan. 1985, "Back-to-Front Display of Voxel-Based Objects", G. Frieder, et al, pp. 52–59.
Computer Graphics, vol. 22, No. 4, Aug. 1988, "Volume Rendering", R. A. Drebin et al, pp. 65–74.

Primary Examiner—Roy N. Envall, Jr.
Assistant Examiner—Ari Bai
Attorney, Agent, or Firm—F. B. Luludis

[57] ABSTRACT

A facility is provided for greatly enhancing the rate at which volumetric data is processed by display on a two-dimensional display. Specifically, the volumetric data is first divided into a predetermined number of sub-blocks, in which a predetermined voxel in each sub-block is then transformed into an associated picture element. The sub-blocks and their associated pixels are then supplied to respective processors forming an array of processors. Each processor then completes the transformation of its sub-block as a function of the coordinates of the associated picture element and respective incremental vectors.

10 Claims, 6 Drawing Sheets

| 0 | 1 | 2 | 3 | 0 | 1 | 2 | 3 | 0 |
|---|---|---|---|---|---|---|---|---|
| 4 | 5 | 6 | 7 | 4 | 5 | 6 | 7 | 4 |
| 0 | 1 | 2 | 3 | 0 | 1 | 2 | 3 | 0 |
| 4 | 5 | 6 | 7 | 4 | 5 | 6 | 7 | 4 |

200

| 0 | 4 | 8 | 12 | 0 | 4 | 8 | 12 |
|---|---|---|----|---|---|---|----|
| 1 | 5 | 9 | 13 | 1 | 5 | 9 | 13 |
| 2 | 6 | 10| 14 | 2 | 6 | 10| 14 |
| 3 | 7 | 11| 15 | 3 | 7 | 11| 15 |
| 0 | 4 | 8 | 12 | 0 | 4 | 8 | 12 |
| 1 | 5 | 9 | 13 | 1 | 5 | 9 | 13 |
| 2 | 6 | 10| 14 | 2 | 6 | 10| 14 |
| 3 | 7 | 11| 15 | 3 | 7 | 11| 15 |

200

ARRANGEMENT FOR DISPLAYING ON A DISPLAY VOLUMETRIC DATA

FIELD OF THE INVENTION

The invention relates to displaying three-dimensional data on a two-dimensional display device within a multiple processor system.

BACKGROUND OF THE INVENTION

Volumetric data defining a three-dimensional image may be generated using a particular scanning device, such as a computed tomography scanner or a magnetic resonance imaging scanner. Presently, graphics systems require an inordinate amount of time to transform volumetric data into a form acceptable for display on a two-dimensional device, such as the raster display screen of a CRT tube. The amount of time currently expended by such graphics systems is typically on the order of minutes. The reason for expending such amount of time is that the transformation processes employed by such prior systems comprise twelve or more steps (i.e., nine floating point multiplications as well as twelve additions). This means that at least twelve processing steps have to be performed to transform a three-dimensional data element into a two-dimensional data element so that the latter element may be displayed on a display. It can be appreciated, therefore, that a large amount of time would indeed to consumed to transform an image defined by millions of three-dimensional data elements into respective two-dimensional data elements.

SUMMARY OF THE INVENTION

High-speed interactive visualization of three-dimensional data (volume rendering) is achieved by partitioning the volumetric data into sub-blocks and then transforming the data forming each such sub-block into respective two-dimensional data elements. The actual transformation process includes a minimum number of steps—illustratively one—rather than the twelve or more steps required by prior arrangements. Specifically, to achieve a processing speed of, for example, one to three seconds, only the first one of the data elements forming a respective sub-block is transformed using the prior approach. Thereafter, the remaining three-dimensional data elements of the sub-block are transformed using what we call an "incremental vector". As such, a three-dimensional data element is transformed into a two-dimensional element using just one step in the transformation process. In an illustrative embodiment of the invention, the sub-blocks are supplied to respective processors which complete the transformation of the remaining three-dimensional data elements using respective incremental vectors.

DETAILED DESCRIPTION

DETAILED DESCRIPTION

Figure 1:
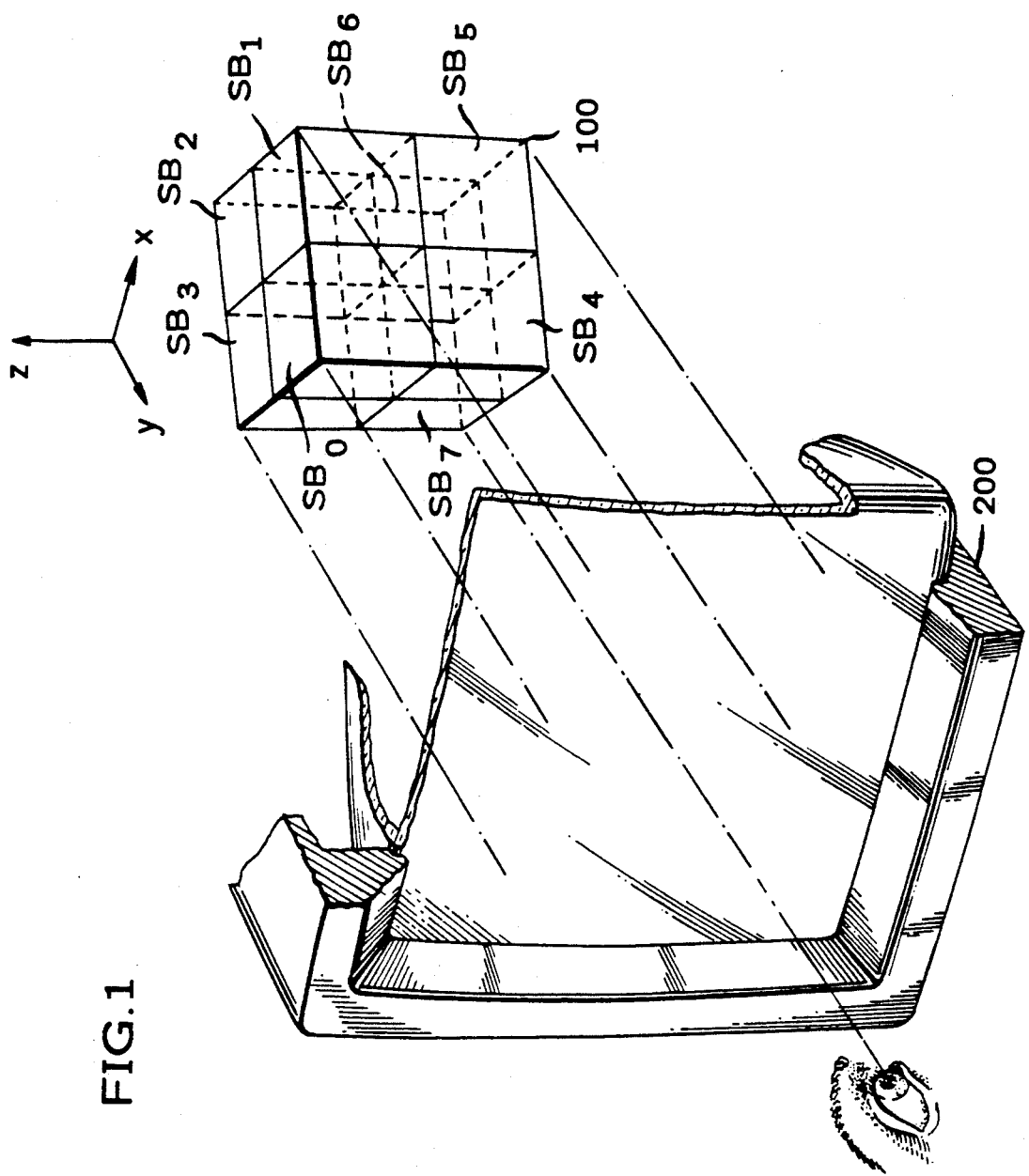
FIG. 1 illustrates a three-dimensional image partitioned in accordance with the principles of the invention.

FIG. 1 illustrates a representation of a three-dimensional (3- D) image 100 which is obtained using well-known digital techniques and then stored in the memory of a host computer (not shown in the FIG.). Such an image may be obtained using any one of a number of difference scanning devices. For example, in the case where image 100 is a so-called medical image, then the image may be obtained using either a computed tomography scanner or magnetic resonance imaging scanner, in which the image is composed of a series of contiguous image slices, or frames. Each slice, in turn, comprises a plurality of so-called voxels. A voxel is a parallelpiped data element, which is then transformed into a two-dimensional picture element (pixel) that may be displayed on a screen, such as CRT display 200.

Once a 3-D image has been captured and stored in memory, a user may then input via a standard input device, such as a computer keyboard (not shown), a request to display the image on display 200. Typically, a request to display an image also includes, inter alia, (a) an instruction specifying one of a number of predetermined rendering modes, as will be explained below, and (b) an instruction specifying a particular orientation in relation to the user's viewpoint, for example, an orientation of 45 degrees about a particular axis, such as the z-axis shown in the FIG.

As mentioned above, prior image processing systems require a large amount of time to transform volumetric data into a two-dimensional composite having a displayed form that is perceived by the user as being a three-dimensional image. However, we have recognized that in an image processing system having a plurality of processors configured as an $m \times n$ mesh array and associated with a distributed frame buffer, the transformation could be achieved in a period of time that is at least an order of magnitude faster than such prior arrangements, i.e., in several seconds.

Specifically, to achieve such results, we arrange the host computer so that, in accordance with an aspect of the invention, it divides the volumetric data into a number of sub-blocks based on, for example, the number of processors forming the $m \times x$ mesh array in the image processing system. For the sake of brevity and clarity it will be assumed that the $m \times n$ mesh array is a $2 \times 4$ mesh comprising an array of 8 processors. It is understood of course that a discussion of the invention in the context of a $2 \times 4$ mesh array pertains equally well to other arrays, such as, for example, a $4 \times 4$ mesh comprising an array of 16 processors. (It is noted that the invention has been implemented on the well-known Pixel machine, a high resolution image processing system that is available from AT&T. The Pixel machine is available in a number of configurations. For example, the purchaser has the option of specifying an array (pixel nodes) having either 16, 20, 32, 40 or 64 processors.)

Continuing, and assuming that the mesh comprises a 2×4 array of processors $P_0$ through $P_7$, the host computer then divides the volumetric data into respective sub-blocks. The division of the volumetric data follows the simple notion that ht number of voxels in each sub-block should be approximately the same to equalize the loading across the array of eight processors. It is seen from FIG. 1, that image 100 is divided into 8 sub-blocks $SB_0$ through $SB_7$ associated with respective processors $P_0$ through $P_7$ (shown below). Once the division of the volumetric data has been determined, the host processor then proceeds to download each sub-block to a respective processor $P_0$ through $P_7$. That is, the host computer downloads from the memory a row of voxels in sub-block $SB_0$ to the associated processor $P_0$. The host computer then downloads one row of voxels in the next sub-block, for example, sub-block $SB_1$, to the associated processor, $P_1$, and so on. Thus, the host computer sequentially steps from sub-block to sub-block of the volumetric data to unload a respective row of voxels and then download the row to the associated processor.

The order in which the host computer downloads a row of voxels from memory is in accord with a well-known voxel processing technique, for example, the Back-to-Front algorithm. The back-to-Front algorithm simply means that the first row of voxels that is downloaded to the associated processor is the row that is farthest from the user's (observer's) viewpoint. Thereafter, the host processor proceeds in order of increasing y and z values, as shown in FIG. 2.

Figure 2:
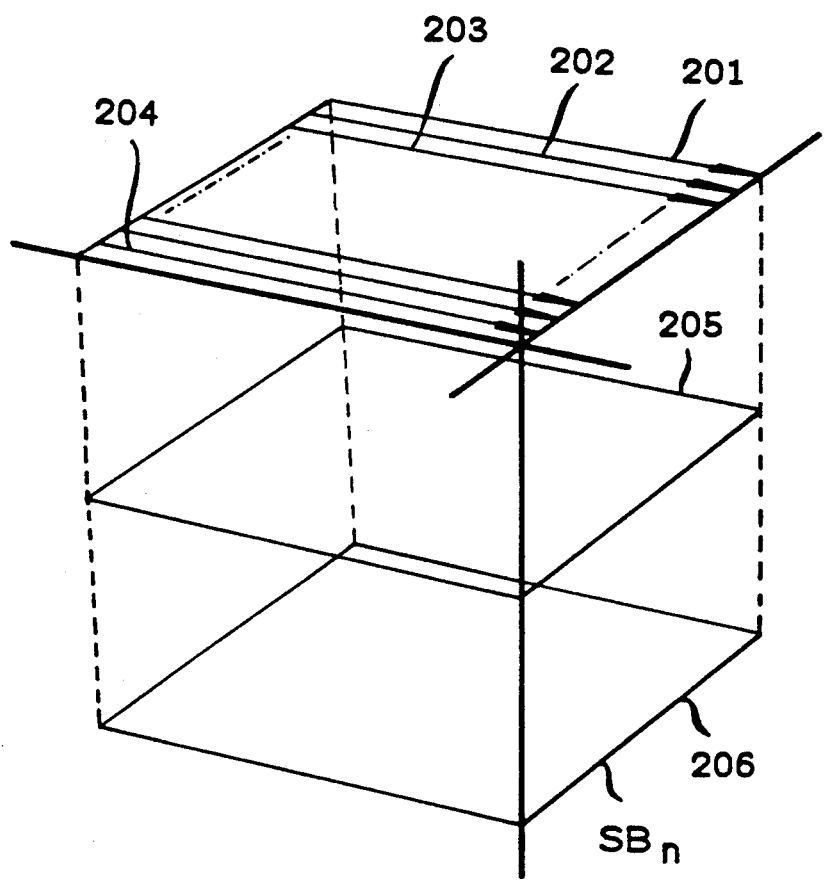
FIG. 2 is useful in understanding the back-to-front processing algorithm.

In particular, sub-block $SB_n$ may be any one of the sub-blocks $SB_0$ through $SB_7$ illustrated in FIG. 2, in which the farthest row of voxels from the user's viewpoint is row 202, and, therefore, is the first row of voxels that is downloaded to the associated processor, for example, processor $P_n$. Then, after processing the other sub-blocks in a similar manner, the host computer downloads to processor $P_n$ the row of voxels that is next farthest from the user's viewpoint, namely row 203. Thus, the host computer beings the downloading function with the "back" row of voxels, continues in the forward ("y") direction and ends with the "front" row of voxels 24 of slice 201. The host computer then proceeds downward in the "z" direction to similarly download the rows of voxels of the remaining slices 205 of the sub-block of volumetric data. The host computer completes the downloading function when it has downloaded to processor $P_n$ the rows of voxels forming the last slice of voxels 206.

It is noted that prior to the downloading of the voxels, the host computer initializes processor $P_0$ through $P_7$ by sending to each of them control instruction specifying, inter alia, (a) the angle of rotation and rendering mode inputted by the user; and (b) the size of the respective sub-block of voxels.

It can be appreciated that the coordinate system which defines the user's (observer's) viewpoint or viewing position would, in most cases, be different from the coordinate system defining the planes containing the volumetric data ("object space").

Specifically, an image coordinate system for display 200 is defined by an X an Y axis parallel to the left-hand and bottom edges of the CRT display, respectively, and a Z axis perpendicular to the face of display 200. This coordinate system defines what is commonly deferred to as the "image space". In an illustrative embodiment of the invention, a transformation matrix is used to transform a voxel contained within the "object space" at coordinate $x_j$, $y_j$ and $z_j$ into a pixel contained within the "image space" at coordinates $X_i$, $Y_i$ and $Z_i$. The $X_i$ and $Y_i$ coordinates specify the location of the pixel on display 200. A level of intensity is then established for the pixel. The level of intensity is based on the particular rendering mode inputted by the user, which may or may not take into account the value of $Z_i$, as will be discussed below.

In our arrangement, we employ the transformation matrix disclosed in the article entitled "Back-to-Front Display of Voxel-Based Objects", by G. Frieder et al, *IEEE Computer Graphics and Applications*, January, 1985 at pp. 52–59, which is hereby incorporated by reference. Specifically, a voxel having coordinate ($x_j, y_j$ and $z_j$) in object space may be transformed into coordinates in image space as follows:

$$\begin{bmatrix} X_i \\ Y_i \\ Z_i \end{bmatrix} = T \begin{bmatrix} x_1 \\ y_1 \\ z_1 \end{bmatrix} + \begin{bmatrix} x_s \\ y_s \\ z_s \end{bmatrix} \quad (1)$$

where;

$$\begin{bmatrix} x_1 \\ y_1 \\ z_1 \end{bmatrix} = \begin{bmatrix} x_j \\ y_j \\ z_j \end{bmatrix} - \begin{bmatrix} x_c \\ y_c \\ z_c \end{bmatrix} ; \quad (2)$$

and where T is the rotation matrix, shown below, ($2x_c$, $2y_c$ and $2z_c$) are the dimensions of the tube enclosing the object and ($2x_s$, $2y_s$ and $2z_s$) are the bounding dimensions of the display device (the screen is $2x_s \times 2y_s$, and $2z_s$ is a depth parameter).

In our arrangement we simplify equations (1) and (2) by setting the aforementioned dimensions to equal the center (C) of the volumetric data. For example, if a sub-block of voxels comprises $256 \times 256 \times 60$ voxels, then C=(128,128,30). With the foregoing in mind, equations (1) and (2) may then be expressed as follows:

$$P'_i = (T(P_1 - C) + C \quad (3)$$

where $P'_i$ is the transformed coordinate $(X_i, Y_i, Z_i)^t$, $P_i$ is the voxel coordinates $(x_j, y_j, z_j)^t$, t is an operator for transposing from row to column, and T, as mentioned above, is the rotation matrix of the following form:

$$T = S \begin{bmatrix} \cos A \cos C + \sin A \sin B \sin C & -\sin A \cos C + \cos A \sin B \sin C & \cos B \sin C \\ \sin A \cos B & \cos A \cos B & -\sin B \\ -\cos A \sin C + \sin A \sin B \cos C & \sin A \sin C + \cos A \sin B \cos C & \cos B \cos C \end{bmatrix} \quad (4)$$

where angles A, B, and C are respectively swivel, tilt and vertical rotation angles that re inputted by the user. S is a scale factor that is also inputted by the user, and may have, at most, a value of 1 for a head-on view. For a rotation about a single axis, or for arbitrary rotations, then the value of S is either $(\frac{1}{2})^{\frac{1}{2}}$ or $(\frac{1}{3})^{\frac{1}{2}}$, respectively.

In our arrangement, the host processor is arranged, in accordance with an aspect of the invention, to transform, using the above equations, the coordinates of the first voxel of the first row of voxels of each respective sub-block into respective pixel coordinates before the sub-block is downloaded to the associated processor. In addition, the resulting image space (pixel) coordinates are included with the aforementioned initialization instructions. Thereafter, each processor completes the transformation of the remaining voxels of the sub-block that it receives from the host processor using, in accordance with an aspect of the invention, so-called incremental vectors, rather than the above transformation equations. As will be discussed below, the transformation of the voxel from object space to image space is thus greatly simplified, since all that a processor has to do to transform a voxel, such as the second voxel in the first row of voxels, is to add the coordinates of a respective one of the incremental vectors to the coordinates of the transformed pixel that has been received from the host processor.

Specifically, the simplification is based on the fact that the voxels are transformed one row or one slice at a time. That is, the values $y_i$ and $z_i$ are constant for given row (slice) of voxels of the same sub-block. Thus, the transformed values change incrementally between voxels in a row, between voxels of adjacent columns and between voxels of adjacent slices. Accordingly, based on the viewing angle, (A,B,C) and the principal of front-to-back projection, incremental vectors $\Delta Vx$, $\Delta Vy$ and $\Delta Vz$ may be calculated for each respective sub-block j of voxels.

In particular, direct implementation of equation (3) requires 9 floating point multiplications as well as 12 additions to transform a voxel. However, equation (3) may be expressed as follows:

$$P_{i,j} = T(P_{i,j} - C) + C \quad (5)$$

$$= T(P_{i-1,j} + \Delta P_{i,j} - C) + C \quad (6)$$

$$= P'_{i-1,j} + T\Delta P_{i,j} \quad (7)$$

$$= P'_{i-1,j} + \Delta P'_{i-1,j} \quad (8)$$

where $P_{i,j}$ is the position of the $i^{the}$ voxel in the sub-block j and $P'_{i,j}$ is the position of the $i^{th}$ pixel in the transformed sub-block j. It can be seen that equation (7) requires only three additions for each voxel. Therefore, if host processor 10, following the Back-to-Front principal, downloads to a respective one of the processor P0 through P7 voxel data contained within a sub-block j, then $\Delta P'_{i-1,j} = \Delta x_j$ if voxel $P_i$ is located at the middle of a row of voxels of sub-block j. In addition, if voxel $P_i$ is located at the middle of a row within sub-block j, then $\Delta P'_{i-1,j} = \Delta V_{yj}$ and if $P_i$ is the first voxel in a slice within sub-block j, then $\Delta P'_{i-1,j} = \{V_{zj}$.

It can be appreciated from the foregoing that a processor, for example, processor P0, transforms the remaining voxels of its associated sub-block by adding the value of incremental vector $\Delta V_{xj}$ to the coordinates of the first transformed pixel to determine the transformation value of the next succeeding pixel in the row in the sub-block j. The vector $\Delta V_{xj}$ is again added to the latter coordinates to determine the transformation value of the next, succeeding pixel (i.e, the third pixel), and so on. Thus, the value of $\Delta V_{xj}$ is iteratively added to determine the coordinate values for respective pixel in a row. Similarly, the processor iteratively adds the value of incremental vector $\Delta V_{yj}$ along the first column of a slice beginning with the first transformed coordinates received from the host processor to determine the transformed coordinate values of the voxels making up that column. Similarly, the processor iteratively adds the value of incremental vector $\Delta V_{zj}$ between slices of voxels beginning with the coordinates of the first transformed pixel to obtain the transformed values of the first voxel in each slice, as shown in FIG. 2.

It is noted that as a result of employing finite precision representation in the transformations of the voxels and using equations (5) through (8), an error could accumulate. As mentioned above, $\Delta P_{i-1,j}$ is $\Delta V_{xj}$ if voles $P_{i,j}$ is in the middle of a row, or $\Delta V_{yj}$ if voxel $P_{i,j}$ is the first voxel of a row, or is $\Delta V_j$ if voxel $P_{i,j}$ is the first voxel of a slice. To handle the accumulated error, we employ incremental vectors $\Delta X_j$, $\Delta Y_j$ and $\Delta Z_j$, instead of their respective counterparts $\Delta V_{xj}$, $\Delta V_{yj}$ and $\Delta V_{zj}$. In this instance $\Delta x_j$ is defined as the same as incremental vector $\Delta V_{xj}$, $\Delta Y_j$ is defined as the incremental vector between the first voxel of the second row and the first voxel of the first row of voxels, and $\Delta Z_j$ is defined as the incremental vector between the first voxel of the second slice and the first voxel of the first slice. As will be shown below, the well-known C language syntax may be employed to readily express the transformation operation. Specifically the vector variable $Z_j$ is used to hold the transformed coordinates of the first voxel in each slice while the vector variable $Y_j$ is used to hold the transformed coordinates of the first voxel in each row and the vector variable $X_j$ is used to hold the transformed coordinates of the current voxel.

Figures 3, 4, 5:
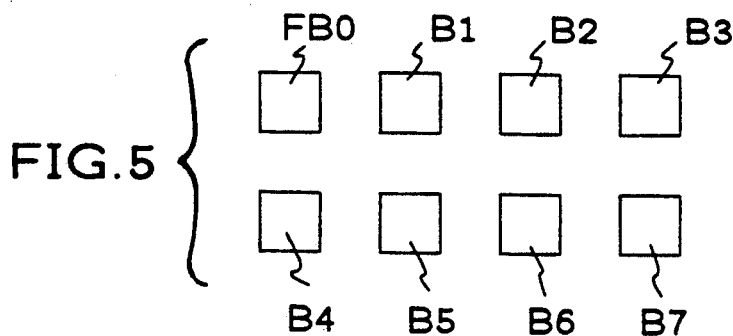
FIGS. 3 and 4 illustrate respective interleaving schemes which are used in the display of picture elements.
FIG. 5 illustrates various memory buffers that tar used of the storage of transformed picture elements within a distributed frame buffer system.

As mentioned above, the invention is employed in a system having a distributed frame buffer, which means that the frame buffer is distributed throughout the array of processor P0 through P7 (or P0 through P15 for an array of 16 processors, and so on). In a distributed frame buffer system, the transformed pixels are interleaved on display 200 in accordance with the predetermined interleaving scheme. FIG. 3 shows an example of one way of interleaving pixels on display 200 when the pixels are contained in distributed frame buffers associated with processor P0 through P7. The values 0 through 7 identify the respective processor that is responsible for displaying the associated pixel value. For example, for row 0, processor P0 through P3 are responsible for displaying the pixel values at columns 0 through 3, respectively, ad so on. Similarly, FIG. 4 shows one example of interleaving pixels on the display for a system employing an array of 16 processors.

Based on the foregoing, it can be appreciated that a sub-block of respective transformed pixels will occupy one area of the display, and, therefore, will be interleaved on the display. Thus, after a processor, for example, processor P0, has transformed a voxel into a pixel the processor must then determine the identity of the processor that will display the transformed pixel on the display. To do this, we arrange each processor so that a modulo N operation is carried out for the values of the X-axis and Y-axis coordinates of each pixel ti transforms. The remainder of each such calculation is then sued to identify the mesh coordinates of the processor that will display the pixel. In the modulo N operation, the values of $N_x$ and $N_y$ are respectively the number of columns and rows formed by the array of processors.

For example, it the values of the $X_i$ and $Y_i$ coordinates of a transformed pixel are 43 and 65, respectively, then the coordinates of the associated processor in a 2×4 array comprising 8 processor, are 3 and 1, as determined by the modulo operation in which $N_x=4$ and $N_y=2$. Accordingly, the processor positioned at column 3 and row 1 in the array displays the pixel value that will occupy the display 200 location defined by row 43 and column 65.

As mentioned above, each processor $P_0$ through $P_7$ maintains in its associated memory a distributed frame buffer. Each processor also maintains a buffer for each of the other processors, as shown in FIG. 5 for one such processor, for example, processor $P_0$. It is noted that a discussion of the memory buffers that processor $P_0$ maintains equally pertains to the way the other processor $P_1$ through $P_7$ maintain their associated buffers.

In particular, processor $P_0$ stores in its distributed frame buffer $FB_0$ the values of those pixels whose X and Y coordinates identify the mesh location of processor $P_0$. The location at which a pixel intensity value is stored in buffer $FB_0$ is commensurate with the value of its X and Y coordinates. The values of all other pixels that processor $P_0$ transforms are stored in respective one of the memory buffers $B_1$ through $B_7$, as determined by the aforementioned modulo operation and at locations commensurate with the values of their respective X and Y coordinates.

It is well-known that the coordinates of different voxels contained in a sub-block, or in other sub-blocks, could be transformed into values having the same X and Y screen (display) coordinates, but possibly having different values of intensity. The volume rendering mode inputted by the user is employed to handle such situations. I will be assumed herein that the volume rendering mode inputted by the user is a maximal "intensity" volume rendering mode. This mode specifies that when the values of the X and Y coordinates of a transformed pixel respectively match the values of the X and Y coordinate of a previously tansformed pixel, then the pixel value defining the highest intensity value (gray scale value) is stored in memory, i.e., either the associated distributed frame buffer or in a respective one of the pixel buffers, as the case may be. The pixel having the lower intensity value is then discarded, i.e., it is not stored in memory. It is understood of course that each processor $P_0$ through $P_7$ may be arranged to process each pixel that it transforms in accordance with one of a number of different volume rendering techniques, such as any one of the techniques discussed in the article entitled "Volume Rendering", by R. A. Drebin et al, and published in *Computer Graphics*, Vol. 22, No. 4 August, 1988, which is incorporated herein by reference. Thus, each processor is not only arranged to transform a voxel into a respective pixel, but is also arranged to then process each newly transformed pixel in accordance with the volume rendering mode inputted by the user.

It can be appreciated from the foregoing that when a processor complete the transformation of its associated sub-block of voxels, its associated pixel buffers contain pixel values that should be displayed on display 200 by the other processors. For example, in the case of processor $P_0$, the contents of pixel buffers $B_1$ through $B_7$ should be displayed on display 200 by processors $P_1$ through $P_7$, respectively, and not processor $P_0$. Processor $P_0$ could be arranged to display the pixel values contained in those pixel buffers in accordance with the aforementioned interleaving scheme shown in FIG. 3. However, such an arrangement would be exceedingly complex, since processor $P_0$ would have to interleave the display of the pixel values that it unloads from its distributed frame buffer $FB_0$ with those that it unloads from pixel buffers $B_1$ through $B_7$. Moreover, processor $P_0$ would have to further interleave the pixels that it unloads from buffers $FB_0$ and $B_1$ through $B_7$ with the pixel values that processors $P_1$ through $P_7$ unload from their respective buffers, which would make the display interleaving scheme an order of magnitude more complex than it ought to be.

To deal with this problem, each of the processors $P_0$ through $P_7$ is arranged, in accordance with an aspect of the invention, to supply the contents of their pixel buffers $B_1$ through $B_7$ to the respective processor. Thus, processor $P_0$ supplies the contents of tis buffers $B_1$ through $B_7$ to processors $P_1$ through $P_7$, respectively, and receives from each of the latter processors the contents of their respective pixel buffers $B_0$. Similarly, processor $P_1$ supplies the content of its pixel buffers $B_0$ and $B_2$ through $B_7$ to processors $P_0$, and $P_2$ through $P_7$, respectively and receives from each of the latter processors the contents of their respective pixel buffers $B_1$, and so on.

Figure 6:
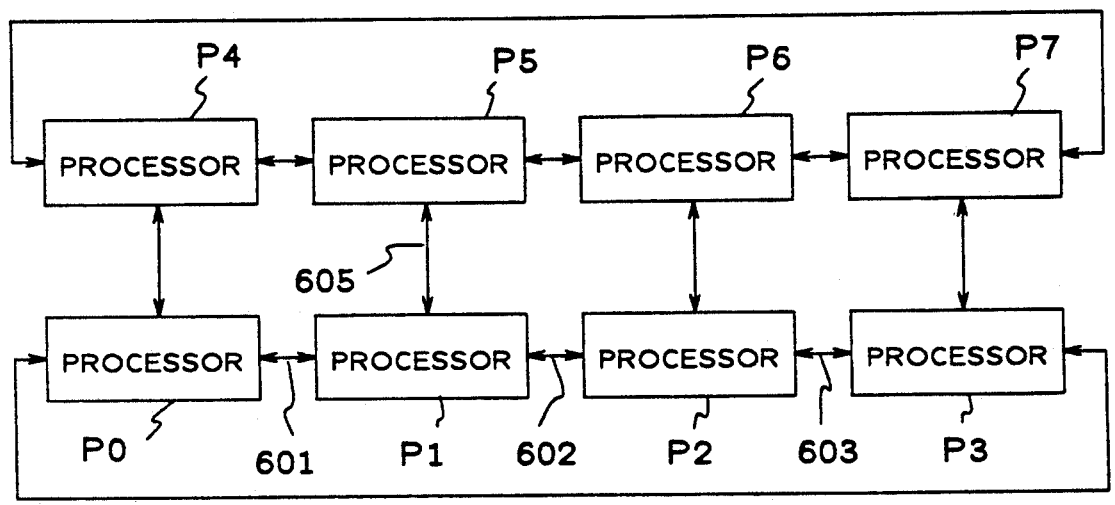
FIG. 6 is useful for showing the manner in which various distributed processor exchange the contents of their respective pixel buffers of FIG. 5 after the processors have transformed their respective sub-blocks of the volumetric data shown in FIG. 1.

The manner in which the processors are arranged to exchange the contents of their respective pixel buffers is illustrated in FIG. 6. Specifically, FIG. 6 shows processor $P_0$ through $P_7$ connected in a 2×4 mesh array such that each processor is connected to each of its neighbors. For example, it is seen that processor $P_2$ is connected to processors $P_1$, $P_3$ and $P_6$. Within the arrangement of FIG. 6, the processors pass data to the left and then either down or up based on the position of a processor in the mesh and the address of the data. For example, processor $P_2$ supplies the contents of its pixel buffer $B_0$ to processor $P_0$ by passing the pixel data to the left to processor $P_1$ via data path 602, which ten delivers the pixel data to processor $P_0$ via data path 601. Similarly, processor $P_3$ supplies the contents of its pixel buffer $B_5$ to processor $P_5$ by passing the pixel data to the left to processor $P_2$ via data path 603, which then passes the pixel data to processor $P_1$ via data path 602. Processor $P_1$ then delivers the pixel data to processor $P_5$ via data path 605. ( it is noted that processors occupying opposite end positions in a mesh, such as, for example, processor $P_0$ and $P_3$, are considered to be neighbors, and are, therefore, connected to one another. It can be appreciated that for a larger mesh comprising, for example, 16 processors (now shown), each processor would be connected to 4 other processors.)

When the foregoing task has been completed, each processor then processes, in accordance with the volume rendering mode inputted by the user, the contents of each pixel buffer that it received from a respective one of the other processor. For example, processor $P_0$ stores each pixel buffer $B_0$ that it receives in associated memory. Processor $P_0$ then unloads those pixels, one at a time, and stores them in distributed frame buffer $FB_0$ at locations defined by the values of their respective X and Y coordinates. If the X and Y coordinates happen to point to a location in distributed frame buffer $FB_0$ at which another pixel values is stored, then processor $P_0$ will compare the value of the unloaded pixel with the value of the stored pixel and save that pixel value defining the highest intensity value, in accordance with the assumed rendering mode.

When the processors $P_0$ through $P_7$ have completed processing the pixels contained in the pixel buffers that they received, they then display the contents of their respective distributed frame buffers in accordance with the aforementioned interleaving scheme.

We now turn to a discussion of the hardware arrangement in which the invention is implemented.

Figure 7:
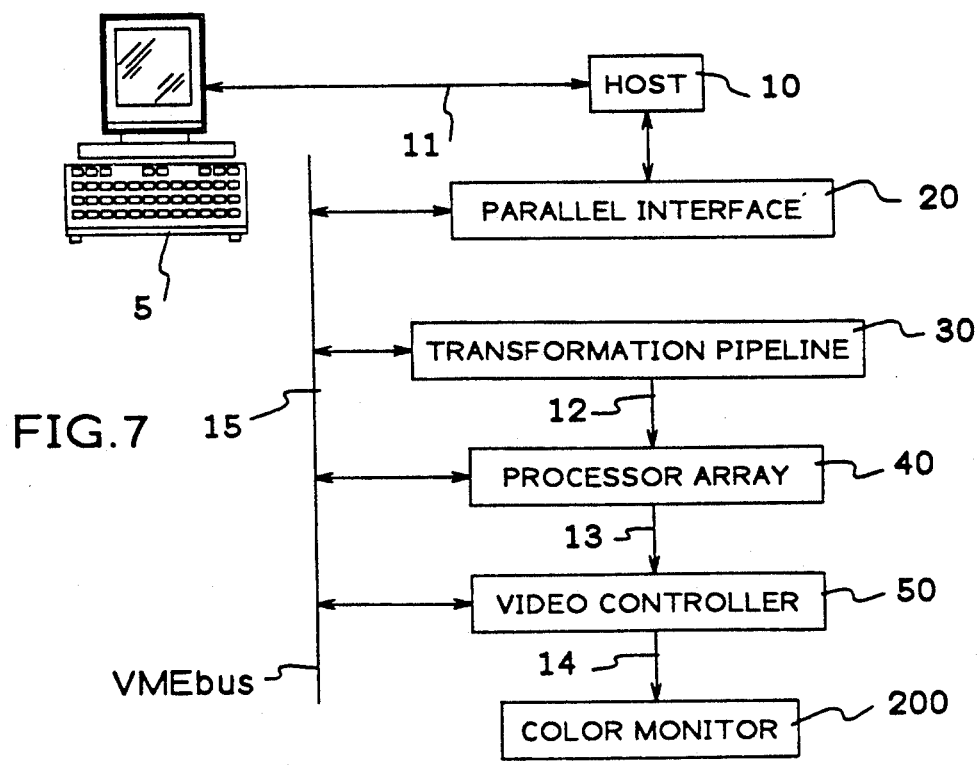
FIG. 7 shows a broad block diagram of a distributed processor system arranged in accordance with the principles of the invention and employing the processors of FIG. 6.

Turning then to FIG. 7 there is shown a broad block diagram of a high resolution graphics system, which, as mentioned above, could be the Pixel machine that is available form AT&T. In particular, the graphics system includes a host processor 10 connected via parallel interface 20 to a peripheral bus 15 and connected to user terminal 5 via bus 11. Host 10 may be conventional general purpose computer that interacts with a user positioned at terminal 5, and interacts with parallel interface 20 via a high speed parallel channel. Parallel interface 20 may be a commercial bus-repeater circuit, such as the VMIVME-REPEATL circuit that is available from VME Microsystems international Corporation, Huntsville, Ala., USA. The purpose of the bus-repeater circuit is to interface the high-speed channel of a processor with a parallel communication bus to which peripherals and other processors may be connected. In a preferred embodiment of the invention, the IEEE P1014/D1.2 bus standard is employed, which is commonly referred to as the VMEbus. A specification of this bus is presented in "The VMEbus Specification", edited by Micrology pbt., Inc. PRINTEX Publishing Co., Inc.

The parallel bus (VMEbus) is connected to transformation pipeline 30, processor array 40 and video controller 50. The VMEbus is a bidirectional bus allowing host 10 to transmit to the other circuits of the graphics system data, commands and control instructions. In response to some of the instructions, information is returned to the host.

In addition to the VMEbus, transformation pipeline 30 is connected to processor array 40 via bus 12, and processor array 40 is connected to video controller 50 via bus 13. Controller 50, in turn, is connected to video display 200 via bus 14. Video display 200 is high resolution video monitor comprising, for example, 1024 lines with each line having 1024 pixel locations.

Transformation pipeline 30 is formed from a cascade of processor, for example, either 9 or 18 processors. Each pipeline processor is a so-called digital signal processor having a FIFO memory at its input as well as at its output. A pipeline processor reads data out of its input FIFO, processes the data, and then stores the result in its output FIFO, in which the later FIFO serves at the input to the next processor in the pipeline. Input to the first processor in the pipeline is provided by the host processor via the VMEbus. The output of the last processor int eh pipeline is then broadcast via bus 12 to all of the processors contained in array 40.

As mentioned above, processor mesh array 40 may be an array comprising, for example, 16 processors formed into a 4×4 mesh. Each processor in array 40 may be so-called digital signal processor having a FIFO memory serving as its input. Each such processor also includes two banks of so-called VRAM memories, which serve as the respective distributed frame buffer (FB-), and further includes a so-called RAM memory of the storage of other data, such as the aforementioned pixel buffer data (B-). A further detailed description of the aforementioned Pixel machine is present in the publication entitled "The Pixel Machine System Architecture", available from AT&T-Pixel Machines, Crawfords Corner Road, Holmdel, N.J. 07733, which is hereby incorporated by reference.

We turn now to a discussion of the software which implements the invention in host processor 10 and in each of the array processors 40.

Figure 8:
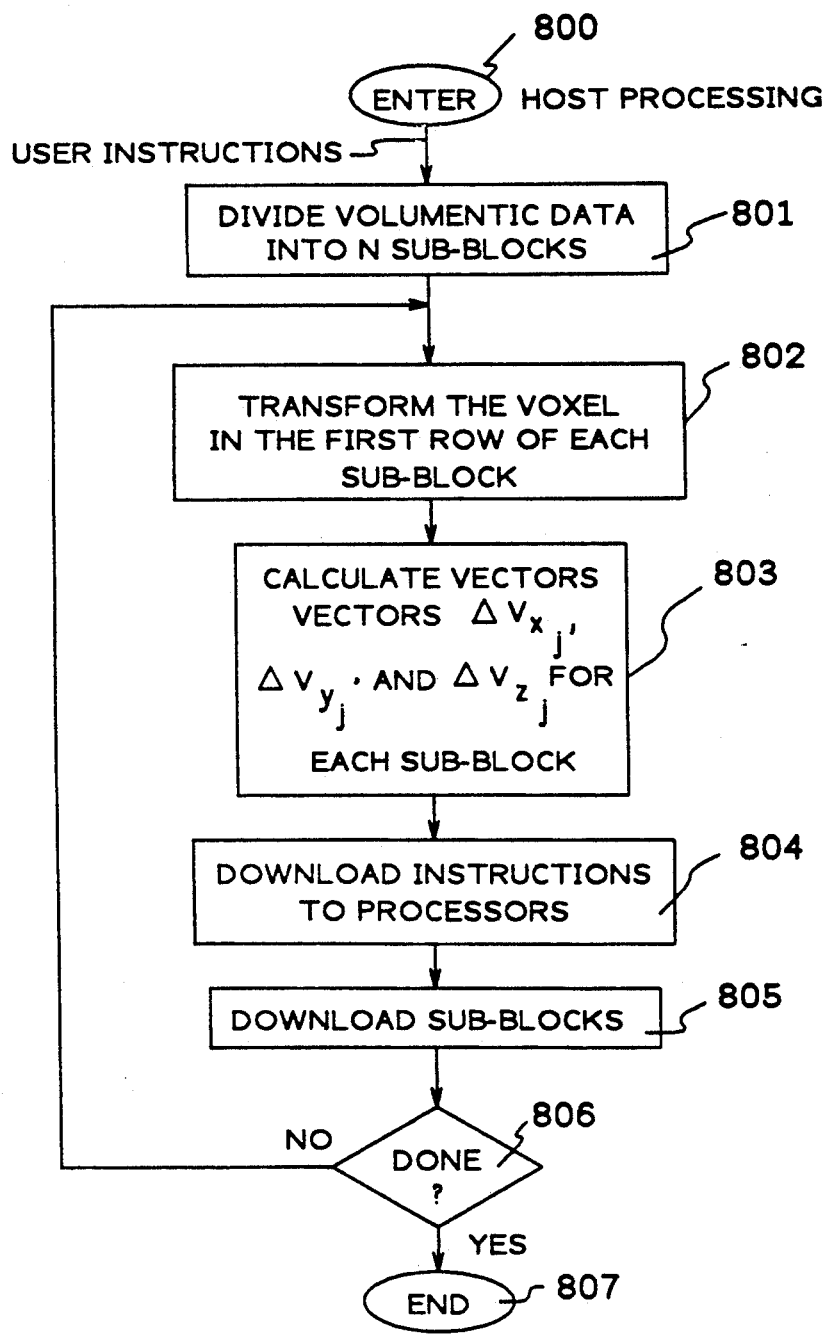
FIGS. 8 and 9 are high level flow charts of the program which implement the invention in the host processor and distributed (array) processors of FIG. 7.

Turning then to FIG. 8, there is shown a high-leave flow chart of the software contained in host processor 10. Specifically, responsive to a user positioned at terminal 5 and entering a request (instructions, including the rendering mode) to display particular volumetric data, the program at block 800, receives the request, stores ti in memory and proceeds to block 801. At block 801 the program partitions (divides) the desired volumetric data into N sub-blocks based on, for example, the number o processors contained in array 40.

It is noted that if the size of the sub-blocks are larger than the respective memories of the processors contained in array 40, then host 10 divides the volumetric data into smaller "chunks". In that event, then, individual ones of the processors contained in array 40 will process more than on sub-block, as will be shown below. The program then proceeds to block 802 after completing the foregoing task.

At block 802, the program transforms the first voxel in the first row of voxels of each of the sub-blocks that are to be downloaded to the respective processors of array 40. The program then proceeds to block 803 where it calculates the incremental vectors $\Delta X_j$, $\Delta Y_j$ and $\Delta X_j$ for each such sub-block, and then proceeds to block 804. At block 804, the program downloads to each of the processor contained in array 40, inter alia, the (a) rendering mode, (b) the respective incremental vectors, (c) angles of rotation, and (d) coordinates of the first transformed voxel of the sub-block as well as the size of the sub-block that the respective array 40 processor will receive. The size of a.sub-block j is specified by the values $size_{x-}$, $block_j$, $size_y-block_j$ and $size_z-block_j$. The program then proceeds to block 805 when it has completed its task at block 804.

At block 805, the program downloads the sub-blocks to the respective processors, in the manner discussed above. The program then proceeds to block 806. At block 806, the program checks "to see" if it is done, that is, that the eprogram has completed the downloading of the sub-blocks. If that is the case, then the program exits via block 807. Otherwise, the program returns to block 802 to download the remaining sub-blocks. It is noted that the program returns to block 802 in the case where the number of sub-block exceeds the number of processors in array 40. In that case, then, the array processors will process more than one sub-block of volumetric data, as mentioned above.

Figure 9:
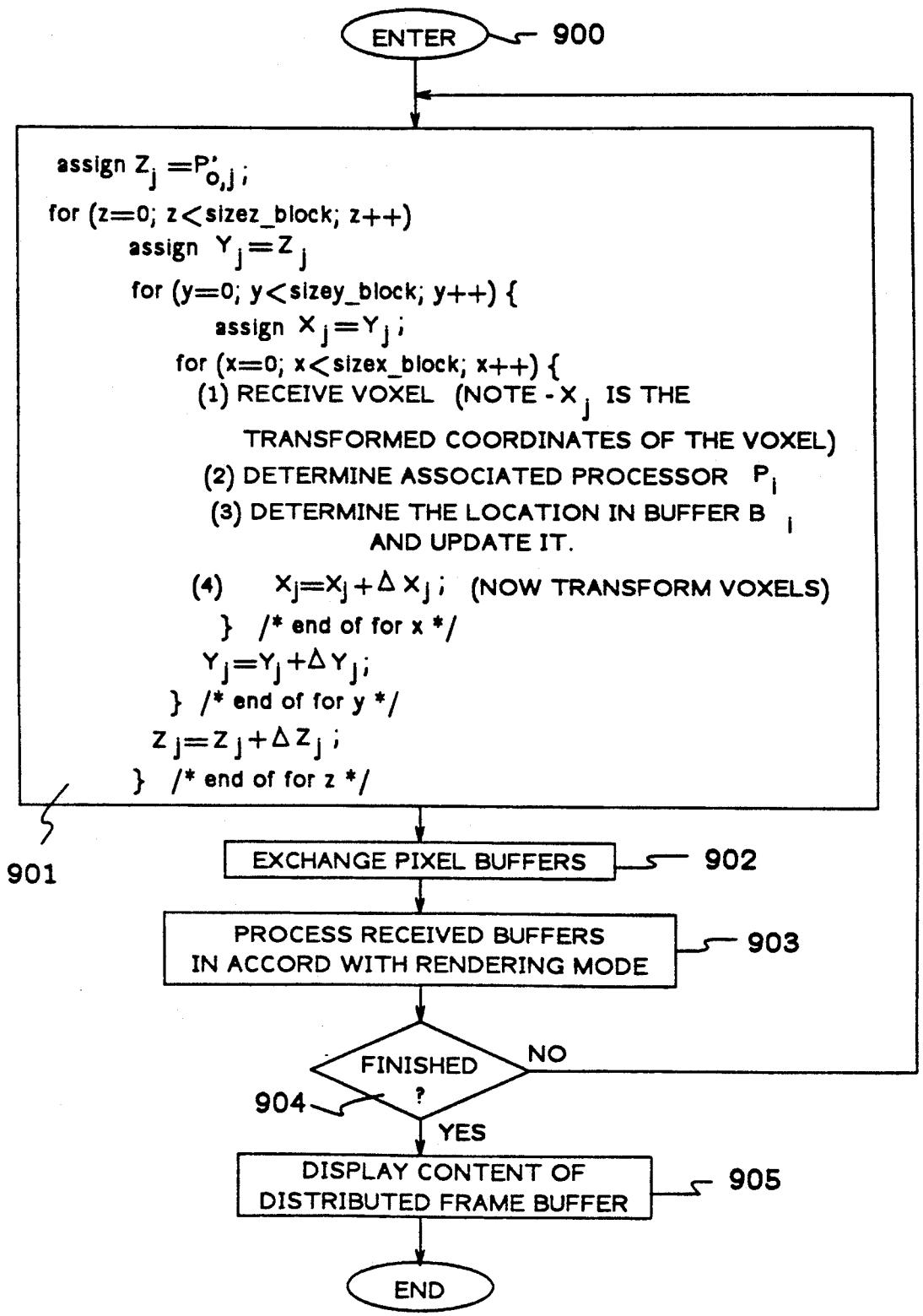

Turning next to FIG. 9, there is shown a high-level flow chart of the program that is contained in each of processors of array 40. It is noted that the program is coded in the well-known C programming language. Specifically, the program is entered at block 900 where it receives and stores in memory the aforementioned instructions downloaded by host processor 10. The program then proceeds to block 901 to transform voxels as they are received from host processor 10. Block 901 is an example of the manner in which the program is coded int eh C programming language to perform the respective function of transforming the received voxels.

In particular, the program comprises three so-called nested loops, namely, an inner loop ("x-for"), next inner loop ("y-for") and outer loop ("z-for"). As is well-known, the "x-for" loop is executed for each value of "y" in the "y-for" loop and the "y-for" loop is executed for each value of "z" in the "z-for" loop. The number of times that the "x-for" loop is executed for each value of "y" is controlled by the value of size$_x$_block$_j$, and the number of times that the "y-for" loop is executed for each value of "x" is controlled by the value of size$_y$_block$_j$. The number of time that the "z-for" loop is executed is controlled by the value of size_block$_j$. the inner loop (x-for) transforms each voxel of a row, as they are received, using the incremental vector $\Delta X_j$. The next inner loop (y-for) transforms the first voxel in the next row of voxels using the incremental vector $\Delta Y_j$ and the outer loop (z-for) transforms the first voxel int eh next slice of the respective sub-block$_n$ of voxels using incremental $\Delta Z_j$, in the manner described above. The program proceeds to block 902 when it completes its task at block 901.

At block 902, and in the manner described above, the program exchanges its pixel buffers with the other processors of array 40. The program then proceeds to block 903. At block 903, the program renders, in accordance with the rendering mode inputted by the user, the contents of the pixel buffers that it receives from the other processor of array 40. The program then proceeds to block 904 to determine if it has completed its task. That is, the program returns to block 901 if it determines that it has another sub-block of voxels to process as result of the original volumetric data being divided into a number of sub-blocks exceeding the number of processors in array 40. Otherwise, the program proceeds to block 905 where it displays the transformed pixels contained in its respective frame buffer, in which the pixels are displayed in accordance with the aforementioned interleaving scheme.

The foregoing is merely illustrative of the principles of our invention. Those skilled in the art will be able to devise numerous arrangements, which although not explicitly shown or described herein, nevertheless, embody those principles that re within the spirit and scope of the invention. For example, it is readily apparent that the processors in array 40 could be arranged to transform the first voxel of the first row of voxels. The processors in array 40 could also be arranged to calculate the incremental vectors themselves. As a further example, it is apparent that the invention could be implemented in those graphics systems not employing a distributed processor configuration, in which case, the host processor itself would be arranged, in accordance with the invention, to treat the volumetric data s one sub-block and transform the first voxel using the aforementioned matrices and then transform the remaining voxels using respective incremental vectors. In addition, it si apparent that the invention may be used in a multi-processor system having a particular inter-processor communications arrangement, such as for example, a shared memory arrangement. Moreover, it is apparent that one skilled in the art could readily employ a different downloading approach, such as, for example, the so-called ray casting image-oriented approach, in place of the Back-to-Front object oriented approach discussed herein. An example of a ray casting approach is discussed in the article entitled "Direct 2-D Display of 3-D Objects" by H. Tuy et al, *IEEE Computer Graphics and Applications*, Vol. 4, No. 10, Oct., 1984.

What is claimed is:

1. Apparatus for converting a three-dimensional image into a two-dimensional image for display on a display, said three-dimensional being defined by a plurality of voxels and said two-dimensional image being defined by a plurality of picture elements, said apparatus comprising
   means for dividing said three-dimensional image into an plurality of sub-blocks and for supplying said sub-blocks to respective ones of a plurality of processors, and
   means contained in each of said processors for transforming a predetermined one of the voxels forming the respective one of said sub-blocks into a respective first picture element and then transforming, as a function of the respective first picture element, the remaining voxels of the respective one of said sub-blocks into respective picture elements for display on said display.

2. The apparatus set forth in claim 1 wherein said apparatus includes a plurality of frame buffers, and wherein said means for transforming includes means for associating individual ones of said picture elements with respective ones of said frame buffers and for storing said picture elements in their associated frame buffer so that said picture elements may be displayed on said display in accordance with a predetermined interleaving scheme.

3. The apparatus set forth in claim 2 wherein said association is determined as a function of transformation coordinates defining said individual ones of said picture elements.

4. Apparatus for displaying on a display a two-dimensional image formed from data defining a three-dimensional image, said three-dimensional image being composed of a plurality f voxels, said apparatus comprising
   a plurality of processors,
   means for dividing said three-dimensional image into sub-blocks of voxels and for supplying said sub-block to respective ones of said processors, and
   means contained in each of said processors for transforming the voxels defining their respective ones of said sub-blocks into respective picture elements, for associating individual ones of said picture elements with respective other ones of said processors and for then supplying said ones of sad picture elements to their associated ones of said processor so that said picture elements may be displayed on said display in accordance with a predefined picture element interleaving scheme.

5. The apparatus defined in claim 4 wherein said sub-blocks of voxels are supplied to said respective ones of said processors in accordance with a front-to-back algorithm.

6. The apparatus defined in claim 4 wherein said means for dividing includes means for transforming a predetermined one of the voxels in each of said sub-block into an associated picture element defined by respective coordinates and for supplying said picture element coordinates to the respective one of said processors, said picture element coordinates being supplied prior to said respective sub-block of voxels.

7. The apparatus defined in claim 6 wherein said predetermined one of the voxels is transformed into said respective picture element using a first predetermined transformation, said first transformation being a function of predetermine matrices and predetermined angles of rotation.

8. The apparatus defined in claim 7 wherein said means for transforming contained in each of said processor transforms the voxels defining their respective sub-blocks, excluding said predetermined one of the voxels, into respective picture elements as a function of a second predetermine transformation.

9. The apparatus defined in claim 4 wherein each of said picture element coordinates includes at least $X_1$ and $Y_i$ coordinates and wherein said processor means for associating includes means for determining each said association as a function of the values of the associated $X_i$ and $Y_i$ coordinates.

10. A method of converting a three-dimensional image into a two-dimensional image for display on a display, said three-dimensional image being defined by a plurality of voxels and said two-dimensional image being defined by a plurality of picture elements, said method comprising the steps of
dividing said three-dimensional image into sub-blocks and supplying said sub-block to respective ones of a plurality of processors,
at each of said plurality processors, transforming a predetermine one of the voxels in the respective one of said sub-blocks into an associated on of said picture elements and then transforming the remaining voxels in the respective one of said sub-blocks into respective picture elements as a function of the coordinates defining the associated on of said picture elements.

* * * * *